United States Patent Office 2,879,287
Patented Mar. 24, 1959

2,879,287

PRODUCTION OF HETEROCYCLIC PHOSPHORUS-CONTAINING COMPOUNDS

William M. Lanham, Charleston, W. Va., assignor to Union Carbide Corporation, a corporation of New York No Drawing. Application March 18, 1957
Serial No. 646,519

10 Claims. (Cl. 260—461)

This invention relates to the production of certain novel 5- and 6-membered heterocyclic phosphorus-containing compounds; and more specifically it concerns the production of novel 2-alkenyl-substituted derivatives of 2-oxo-1,3,2-dioxaphospholanes and 2-oxo-1,3,2-dioxaphosphorinanes which have important utility for a wide variety of services. Thus, they have been found to be useful as insecticides, and as valuable thermosetting plasticizers for various synthetic resins, such as the polyvinyl chloride resins, and copolymers of vinyl chloride with a vinyl ester of a lower fatty acid, such as vinyl acetate. These novel compounds function as thermosetting plasticizers in the preparation of vinyl resin plastisols. They also form useful resinous copolymers with other polymerizable olefinically-unsaturated compounds such as the vinyl halides, vinyl esters of the lower fatty acids, and acrylic and methacrylic esters, nitriles and the like.

The novel products of the invention may be designated by the formula:

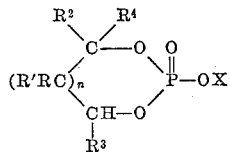

wherein R, R', $R^2$, $R^3$ and $R^4$, respectively, designate hydrogen or a lower alkyl group having 1 to 6 carbon atoms; $n$ represents 0 or 1; and X designates a radical having the structure $$-CH_2CR^6=CHR^5$$

wherein $R^5$ designates a radical of the class consisting of hydrogen and the alkyl radicals having from 1 to 10 carbon atoms; and $R^6$ designates a radical of the class consisting of hydrogen and the lower alkyl radicals. Preferably $R^6$ represents hydrogen or a methyl or ethyl group.

The novel olefinically unsaturated heterocyclic phosphates of the invention can be made by any of several methods, those involving the reaction of a 2-alken-1-ol with a 2-halo-2-oxo-1,3,2-dioxaphospholane or corresponding dioxaphosphorinane being preferred.

In accordance with one preferred form of the invention, represented by the typical equation:

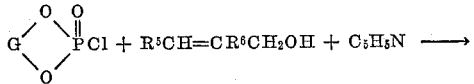

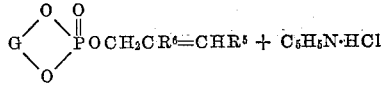

wherein G designates the hydrocarbon residue of a 1,2- or a 1,3-alkanediol, the heterocyclic chlorophosphate is added slowly, preferably dropwise, to an agitated solution of at least the stoichiometric quantities of the alkenol and pyridine, or other aliphatic or aromatic tertiary amine, in solution in an inert solvent such as ethyl ether or benzene maintained at a reaction temperature of around 10° to 30° C. A 10% to 100% molar excess of the alkenyl alcohol and of the pyridine or other tertiary amine can be employed. If desired a solution of the alkenol and tertiary amine may be added dropwise to the phosphorus-containing reactant. To facilitate complete reaction the reaction mixture then preferably is heated at around 70° C. for a period of from 4 to 6 hours, and then is filtered. In instances where the reaction product is water-insoluble the filtrate is washed with water or with an aqueous solution of a base such as sodium hydroxide or sodium bicarbonate, followed by water washes. The washed filtrate then is freed from water and solvent either by drying over a suitable drying agent such as sodium sulphate followed by pot distillation, or by pot distillation alone. In instances where the desired product is water-soluble the aforesaid filtrate is exactly neutralized with methanolic sodium hydroxide, filtered, and the resultant filtrate freed from methanol, water, amine and solvent by pot distillation. The residual products can be purified by distillation under high vacuum, using a falling film type molecular still.

Among representative 2-alken-1-ols suitable for use in the process are the following: allyl alcohol, crotyl alcohol, methallyl alcohol, ethallyl alcohol, 2-penten-1-ol, 2-hexen-1-ol, 2-hepten-1-ol, 2-octen-1-ol, 2-ethyl-2-hexen-1-ol, 2-decen-1-ol, 2-tridecen-1-ol, 2-methyl-2-buten-1-ol, 2-nonen-1-ol, isopropallyl alcohol, 2-undecen-1-ol, 2-dodecen-1-ol and other alkenols having the structure $R^5CH=CR^6CH_2OH$, wherein $R^5$ represents hydrogen or an alkyl radical having 1 to 10 carbon atoms, and $R^6$ represents hydrogen or a lower alkyl radical.

The novel compounds of the invention also can be prepared by adding the heterocyclic halophosphate dropwise to a mixture of the alkenol and sodium hydroxide or potassium hydroxide, in accordance with the typical equation:

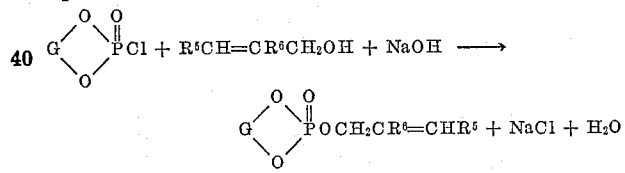

the 2-alkenol and sodium hydroxide being used in at least stoichiometric quantities relative to the phosphorus-containing compound. This reaction is conducted in the following general manner:

The heterocyclic halophosphate (preferably in solution in some inert solvent such as benzene) is added dropwise to an agitated solution (or finely divided suspension) of at least the stoichiometric quantity of the alkali metal hydroxide in at least the stoichiometric amount of the alkenyl alcohol and an inert solvent for the reaction product such as benzene at a reaction temperature of 5°–10° C. A 10% to 100% molar excess of the base and of the alkenyl alcohol can be used. To facilitate complete reaction, the reaction mixture then is allowed to warm to 25° C. and held at 25° C. for 2–8 hours or it is heated at around 50°–70° C. for 0.5–2 hours. The products are isolated and purified in the same manner as described above when using a tertiary amine.

Heterocyclic halophosphates useful as starting materials in the process have structures designated by the formula

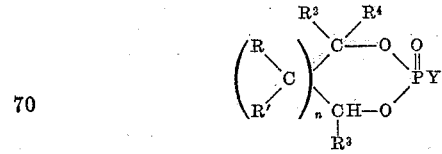

wherein R, R′, R², R³ and R⁴, respectively, designate hydrogen or a lower alkyl radical; Y designates chlorine or bromine; and $n$ is 0 or 1. Such compounds, which are now known, can be made by reacting phosphoryl chloride or phosphoryl bromide, preferably in approximately equimolar proportions, with a glycol of the type:

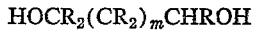

where $m$ is 0 or 1, and each R is hydrogen, of the same or a different lower alkyl group.

Methods for making such heterocyclic halophosphate starting materials are disclosed in my copending application, Serial No. 340,400, filed March 4, 1953; and in U.S. Patent No. 2,661,365.

The novel products of the invention also can be prepared by reacting a 1,2- or a 1,3-alkanediol of the type hereinbefore described with a dichlorophosphate ester of a primary 2-alken-1-ol in accordance with the following equation:

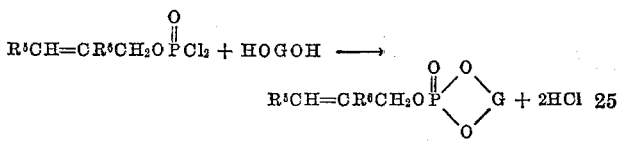

wherein R⁵, R⁶ and G have the hereinbeforedescribed meanings. The process just described is conducted in the following general manner:

The dichlorophosphate ester of the primary alkenol is added dropwise to a solution of the stoichiometric quantity of the glycol in an inert high-boiling solvent such as benzyl chloride at a reaction temperature of around 55° C. under about 40 mm. of mercury pressure. The reaction mixture then is refluxed for 8–14 hours at 100° C. under around 25 mm. of mercury pressure in order to complete the reaction and remove the evolved hydrogen chloride. Neutralization, isolation, and purification of the residue products are the same as described above when using a tertiary amine.

The following specific examples serve to illustrate the invention.

*Example 1*

To an agitated solution consisting of 70 grams (1.2 mols) of allyl alcohol, 119 grams (1.5 mols) of pyridine and 400 cc. of ethyl ether, maintained at 15° C., were added dropwise 226 grams (one mol) of 2-chloro-5-ethyl - 2 - oxo - 4 - propyl - 1,3,2 - dioxaphosphorinane. The mixture then was agitated for 3 hours at 30° C. and filtered. The filtrate was washed with water, dried under sodium sulfate, stripped by distillation to a kettle temperature of 75° C. under 2 mm. of mercury, and then further stripped by distillation at 100° C. under 0.7 mm. mercury using a falling film type still and then was distilled at 124 to 135° C. under 0.7 mm. mercury using the same still. The residual 5-ethyl-2-oxo - 2 - (2 - propenoxy) - 4 - propyl - 1,3,2 - dioxaphosphorinane was recovered in the form of a colorless liquid which decolorized a bromine solution, and which had the following properties: acidity=0.09 cc. of normal KOH/g.; specific gravity at 30/15=1.090, $n$ 30/D =1.4571, percent yield=49, based on the phosphorus-containing reactant.

This compound was co-polymerized with acrylonitrile to form a resinous co-polymer. The polymerization rate at 50° C., using 1% of diacetyl peroxide as catalyst, gave a conversion of 4% per hour for a 50:50 by weight mixture of the two monomers.

A product made in generally similar manner to the foregoing and having the same structure was found to be a useful thermosetting plasticizer for a polyvinyl chloride resin. A clear, hard film free from tackiness was secured when a mixture consisting of 37.5% by weight of the said compound and 62.5% by weight of a polyvinyl chloride resin was mixed with 3% (based upon the weight of the phosphorus-containing compound) of tertiary butyl perbenzoate as catalyst and subsequently was used to cast a 4–5 mil film on aluminum foil, and the film was cured for 5 minutes at 350° F.

*Example 2*

To a solution of 79 grams (one mol) of pyridine, 58 grams (one mol) of allyl alcohol, and 400 cc. of benzene, maintained at 25 to 30° C., there were added dropwise 241 grams (one mol) of 5-butyl-2-chloro-5-ethyl-2-oxo-1,3,2-dioxaphosphorinane. The reaction mixture was then heated at 70° C. for 6 additional hours and filtered at 25° C. The filtrate was washed successively with an aqueous sodium bicarbonate solution and with water, and then was stripped by distillation to a kettle temperature of 100° C. under less than 2 mm. mercury. Thus was secured 238 grams of 5-butyl-5-ethyl-2-oxo-2-(2-propenoxy)-1,3,2-dioxaphosphorinane as a yellow liquid still residue having the following properties: acidity=0.05 cc. of normal KOH/g.; $n$ 30/D=1.4633; specific gravity at 25/15° C.=1.118. The percent yield=91, based upon the phosphorus-containing reactant.

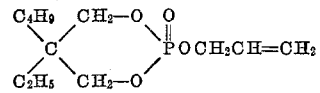

This compound was found to give a 95–100% control in 24 hours of bean aphids on infested nasturtium plants at a 0.08% concentration in water, and a 95–100% control of Mexican bean beetle larvae at a 0.25% concentration in water.

*Example 3*

To an agitated solution of 1 mol of allyl alcohol, 1 mol of pyridine and 400 cc. benzene, maintained at 25 to 30° C., there were added dropwise 1 mol of 2-chloro-4-methyl-2-oxo-1,3,2-dioxaphosphorinane. The reaction mixture was heated at 70° C. for 6 additional hours, and then filtered at 25° C. The filtrate was neutralized with an approximately 15% methanolic sodium hydroxide solution and was filtered using a diatomaceous earth filter aid. The resultant filtrate was stripped by pot distillation at 100° C. under less than 2 mm. of mercury, yielding 4 - methyl - 2 - oxo - 2 - (2 - propenoxy) - 1,3,2 - dioxaphosphorinane in the form of a liquid still residue which, after filtering, had the following properties: acidity=0.13 cc. normal KOH/g.; $n$ 30/D= 1.4560; specific gravity at 25/15° C.=1.254; yield=95% based upon the phosphorus-containing reactant.

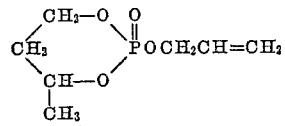

*Example 4*

To an agitated solution of 1 mol of allyl alcohol, 1 mol of pyrodine, and 400 cc. of benzene, maintained at 25–30° C., there were added dropwise 1 mol of 2-chloro-4,6-dimethyl-2-oxo-1,3,2-dioxaphosphorinane. The reaction mixture was then heated at 70° C. for 6 additional hours, and filtered at 25° C. The filtrate was exactly neutralized by an approximately 15% methanolic sodium hydroxide solution, filtered using a filter aid, and stripped by pot distillation at 100° C. under less than 2 mm. of mercury pressure. There thus was obtained 4,6-dimethyl - 2 - oxo - 2 - (2 - propenoxy) - 1,3,2 - dioxaphosphorinane as a clear light brown water-soluble liquid having the following properties: acidity=0.15 cc. normal KOH/g.; salt content=0.1 cc. of normal HClO₄/g.; $n$ 30/D=1.4530; specific gravity at 25/15°

C.=1.174; percent yield=88, based upon the phosphorus-containing reactant.

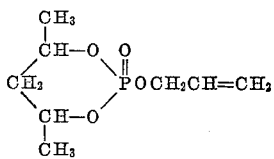

This product is an effective insecticide, and has been found to give a 95–100% control of bean aphids and red spider mites in 24 hours at a concentration of 0.25% thereof in aqueous solution.

Other illustrative novel compounds of the invention include the following:

2 - oxo - 2 - (2 - propenoxy) - 1,3,2 - dioxaphospholane; 4 - methyl - 2 - oxo - 2 - (2 - propenoxy) - 1,3,2-dioxaphospholane; 2 - (2 - butenoxy) - 4,5 - dimethyl-2 - oxo - 1,3,2 - dioxaphospholane; 4 - ethyl - 2 - (2-hexenoxy) - 2 - oxo - 1,3,2 - dioxaphospholane; 2 - oxo-2 - (2 - propenoxy) - 1,3,2 - dioxaphosphorinane; 2 - (2-butenoxy) - 2 - oxo - 1,3,2 - dioxaphosphorinane; 2 - (2-butenoxy) - 5 - ethyl - 2 - oxo - 4 - propyl - 1,3,2 - dioxaphosphorinane; 5 - butyl - 5 - ethyl - 2 - (2 - hexenoxy)-2 - oxo - 1,3,2 - dioxaphosphorinane; 2 - (2 - decenoxy)-5 - ethyl - 2 - oxo - 4 - propyl - 1,3,2 - dioxaphosphorinane; 4,6 - dimethyl - 2 (2 - octenoxy) - 2 oxo - 1,3,2-dioxaphosphorinane; 2 - (2 - butenoxy) - 4,6 - dimethyl - 2 - oxo - 1,3,2 - dioxaphosphorinane; 5 - butyl - 5-ethyl - 2 - oxo - 2 - (2 - tridecenoxy) - 1,3,2 - dioxaphosphorinane and 4,6-dimethyl-2-(2-hexenoxy)-2-oxo-1,3,2-dioxaphosphorinane.

By the practice of this invention there is made available for the first time a novel class of beta, gamma-olefinically unsaturated heterocyclic phosphate esters having important utility as insecticides, as polymerizable compounds compatible with various vinyl compounds and acrylic compounds, and suitable as polymerizable plasticizers for various vinyl chloride-containing vinyl resins, as well as being useful per se for the production of resinous compositions. Homopolymers and copolymers of these polymerizable compounds with various vinyl compounds, and with acrylic and methacrylic compounds such as the acids and their esters and amides, can be prepared. Other fields of utility for the polymerizable alkenyl compounds of the invention will readily be recognized by persons skilled in the art.

This application is a continuation-in-part of my pending application Serial No. 340,399, filed March 4, 1953.

The invention is susceptible of modification within the scope of the appended claims.

What is claimed is:

1. Heterocyclic 2-alkenyl phosphate esters having structures corresponding to the formula

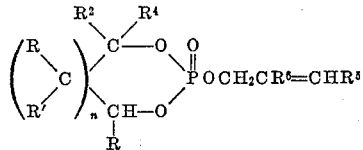

wherein R, R', R$^2$, R$^3$, R$^4$ and R$^6$, respectively, designate a member of the class consisting of hydrogen and the lower alkyl radicals; R$^5$ designates a member of the class consisting of hydrogen and the alkyl radicals having from 1 to 10 carbon atoms; and $n$ is an integer of the class consisting of 0 and 1.

2. Heterocyclic 2-alkenyl phosphate esters having structures corresponding to the formula

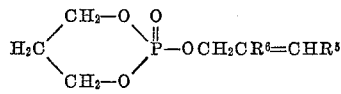

wherein R$^6$ designates a member of the class consisting of hydrogen and the lower alkyl radicals; and R$^5$ designates a member of the class consisting of hydrogen and the alkyl radicals having from 1 to 10 carbon atoms.

3. Heterocyclic 2-alkenyl phosphate esters having the structure corresponding to the formula

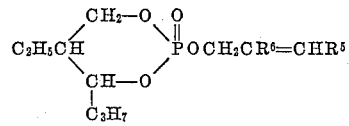

wherein R$^6$ designates a member of the class consisting of hydrogen and the lower alkyl radicals; and R$^5$ designates a member of the class consisting of hydrogen and the alkyl radicals having from 1 to 10 carbon atoms.

4. Heterocyclic 2-alkenyl phosphate esters having structures corresponding to the formula

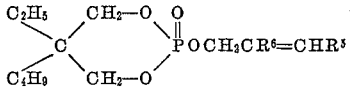

wherein R$^6$ designates a member of the class consisting of hydrogen and the lower alkyl radicals; and R$^5$ designates a member of the class consisting of hydrogen and the alkyl radicals having from 1 to 10 carbon atoms.

5. Heterocyclic 2-alkenyl phosphate esters having structures corresponding to the formula

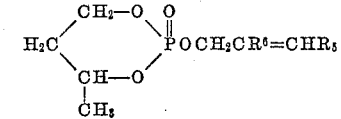

wherein R$^6$ designates a member of the class consisting of hydrogen and the lower alkyl radicals; and R$^5$ designates a member of the class consisting of hydrogen and the alkyl radicals having from 1 to 10 carbon atoms.

6. Heterocyclic 2-alkenyl phosphate esters having structures corresponding to the formula

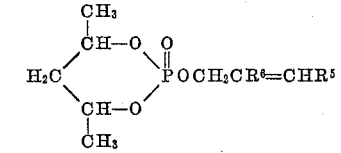

wherein R$^6$ designates a member of the class consisting of hydrogen and the lower alkyl radicals; and R$^5$ designates a member of the class consisting of hydrogen and the alkyl radicals having from 1 to 10 carbon atoms.

7. 5 - ethyl - 2-oxo-2-(2-propenoxy)-4-propyl-1,3,2-dioxaphosphorinane.

8. 5 - butyl - 5-ethyl-2-oxo-2-(2-propenoxy)-1,3,2-dioxaphosphorinane.

9. 4 - methyl - 2-oxo-2-(2-propenoxy)-1,3,2-dioxaphosphorinane.

10. 4,6 - dimethyl - 2-oxo-2-(2-propenoxy)-1,3,2-dioxaphosphorinane.

No references cited.